US006092784A

United States Patent [19]
Kalfsbeck

[11] Patent Number: 6,092,784
[45] Date of Patent: Jul. 25, 2000

[54] COIL ASSEMBLY USEFUL IN SOLENOID VALVES

[75] Inventor: Steve Jon Kalfsbeck, Sarasato, Fla.

[73] Assignee: Dana Corporation, Toledo, Ohio

[21] Appl. No.: 09/001,148

[22] Filed: Dec. 30, 1997

[51] Int. Cl.[7] .......... F16K 31/02
[52] U.S. Cl. .......... 251/129.15; 137/625.65
[58] Field of Search .......... 251/129.15; 137/625.65; 335/278, 251, 255

[56] References Cited

U.S. PATENT DOCUMENTS

| | | | |
|---|---|---|---|
| 3,262,027 | 7/1966 | Zaleske et al. . | |
| 3,593,241 | 7/1971 | Ludwig . | |
| 4,409,580 | 10/1983 | Ishigaki . | |
| 4,442,998 | 4/1984 | Ohyama et al. . | |
| 4,552,179 | 11/1985 | Tarusawa et al. . | |
| 4,643,227 | 2/1987 | Suzuki et al. . | |
| 4,649,360 | 3/1987 | Reifler et al. . | |
| 4,697,608 | 10/1987 | Kolze et al. | 251/129.15 |
| 4,805,870 | 2/1989 | Mertz . | |
| 4,880,205 | 11/1989 | Ellison . | |
| 4,909,475 | 3/1990 | Triolo et al. . | |
| 5,002,253 | 3/1991 | Kolchinsky et al. | 251/129.15 |
| 5,004,440 | 4/1991 | Suzuki . | |
| 5,018,797 | 5/1991 | Takata . | |
| 5,197,507 | 3/1993 | Miki et al. . | |

*Primary Examiner*—Kevin Shaver
*Assistant Examiner*—John P. Welsh
*Attorney, Agent, or Firm*—Millen, White, Zelano & Branigan

[57] ABSTRACT

A coil assembly for miniature solenoid valves, such as size SAE-6 valves, includes a flux tube which passes through the hollow core of the coil assembly. The flux tube is formed against a shoulder of a coupling member by using the "Tammel" orbital head forming technique in which a forming tube orbits around the end of the flux tube to form a flange which bears against the shoulder. A flux washer is disposed adjacent the coil and is held tightly thereagainst by the flux tube to help linearize magnetic force exerted upon energizing the coil. In order to facilitate stroking and destroking the solenoid valve, the tank ports close slightly before the pressure ports are opened when stroking and slightly after when destroking. The coil is designed to saturate the magnetic circuit early to diminish the effect of coil heating and resultant force loss at a given stroke displacement.

22 Claims, 5 Drawing Sheets

COIL ASSEMBLY USEFUL IN SOLENOID VALVES

FIELD OF THE INVENTION

The present invention relates to a coil assembly useful in solenoid valves, and more particularly, the present invention relates to a coil assembly useful in miniature solenoid valves.

BACKGROUND OF THE INVENTION

Currently, there are no SAE 6-sized solenoid valves on the market which operate effectively at elevated temperatures above about 250° Fahrenheit and which exert over 6 pounds of force. In the past, it has proved difficult to assemble such solenoids in a way that maintains high efficiency at low current as well as providing a linearized force-stroke curve for increased force at the hydraulic switching point. Moreover, it has been difficult to provide efficient hydraulic switching in very small solenoid valves because the valves tend to stick at the switching point. In order to overcome sticking, the tendency has to been to use more powerful larger valve components which, of course, increases the expense and size of the valves. It is now highly desirable to have replaceable electromechanical assemblies in the automotive industry so that an entire assembly is replaced when a component thereof malfunctions. This is in large part because it is very difficult to determine which miniature component is malfunctioning. Accordingly, there is the need to high reliability in components such as miniature valves and it is important that this high reliability be achieved at a low cost. If the valves are relatively expensive, then the cost of replacement electromechanical assemblies is increased and if the valves are unreliable, then a malfunction in a single valve can result in an entire assembly having to be replaced.

As is clear from patents such as U.S. Pat. No. 4,552,179, assembly of miniature solenoid valves has presented a challenge for many years. Cost effective assembly techniques which accomplish more than one function such as minimizing the flux leakage and providing a linearized stroke curve which can be matched to a return spring curve are not available.

SUMMARY OF THE INVENTION

In view of the aforementioned considerations, it is a feature of the present invention to provide low cost miniature valves which are efficient and reliable.

The present invention relates to a coil assembly for a solenoid comprising a coil having a hollow core and a housing surrounding the coil, the housing having an end plate portions with openings therethrough aligned with the core. A fitting is disposed at one end of the housing, the fitting having a bore therethrough aligned with the hollow core and having an outward extending radial shoulders. A flux tube has a first end with a radially extending shoulder which engages one of the end plate portions of the housing and a second end formed into an outwardly extending flange for engaging the outwardly extending shoulder of the fitting.

In a further aspect of the coil assembly, the outwardly extending flange of the flux tube is unitary therewith and formed by a series of orbital impacts.

In still a further aspect the coil assembly includes a washer of magnetic material disposed in the housing adjacent one end of the flux tube.

In still a further aspect of the coil assembly the fitting has an internal groove therein in which a seal is seated, the end of the flux tube having been deformed from a diameter less than the tube so that the seal slips readily thereover into the outwardly extending flange.

In a further aspect, the invention is directed to a solenoid assembly comprising a coil defining a hollow core and having a first end and a second end wherein a housing surrounds the coil. The housing has an axially extending wall positioned around the coil and a first end wall over the first end of the coil with the first end wall having an opening therethrough. A fitting is disposed adjacent a second end of the housing and includes a radial surface facing away from the housing. A flux tube of non-magnetizable material extends through the coil, thereby allowing maximum flux to be directed to the working gap. The flux tube having a radially extending portion is associated therewith at a first end thereof and a flange at a second end thereof. The radially extending portion of the flux tube has a diameter greater than that of the opening through the first end of the housing. The flange is riveted into engagement with the radial surface of the fitting to hold the fitting to the housing. An armature is mounted within the flux tube for axial movement therein, and a pole piece is fixed within the flux tube for exerting a magnetic force on the armature to move the armature in a first direction against the bias of a spring.

In a further aspect, the solenoid assembly includes a washer of magnetic material disposed between the coil and the first end of the housing, the washer having sufficient mass to linearize the magnetic force so as to parallel the spring force over the stroke of the armature.

In a further aspect, the solenoid assembly includes a spring which acts on the armature applying a spring force in a second direction opposite the first direction.

In still another aspect of the solenoid assembly a valve spool assembly is included wherein the valve spool assembly has a housing coupled to the fitting and a valve spool within the housing actuated by the armature. The housing includes a plurality of radially opening ports and the spool includes a plurality of lands for opening and closing the ports, the lands opening one port before opening another port.

In still another aspect of the solenoid assembly one port is a port connected to a pressure pump. Another other port is an exhaust port connected to tank and other ports are work ports.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
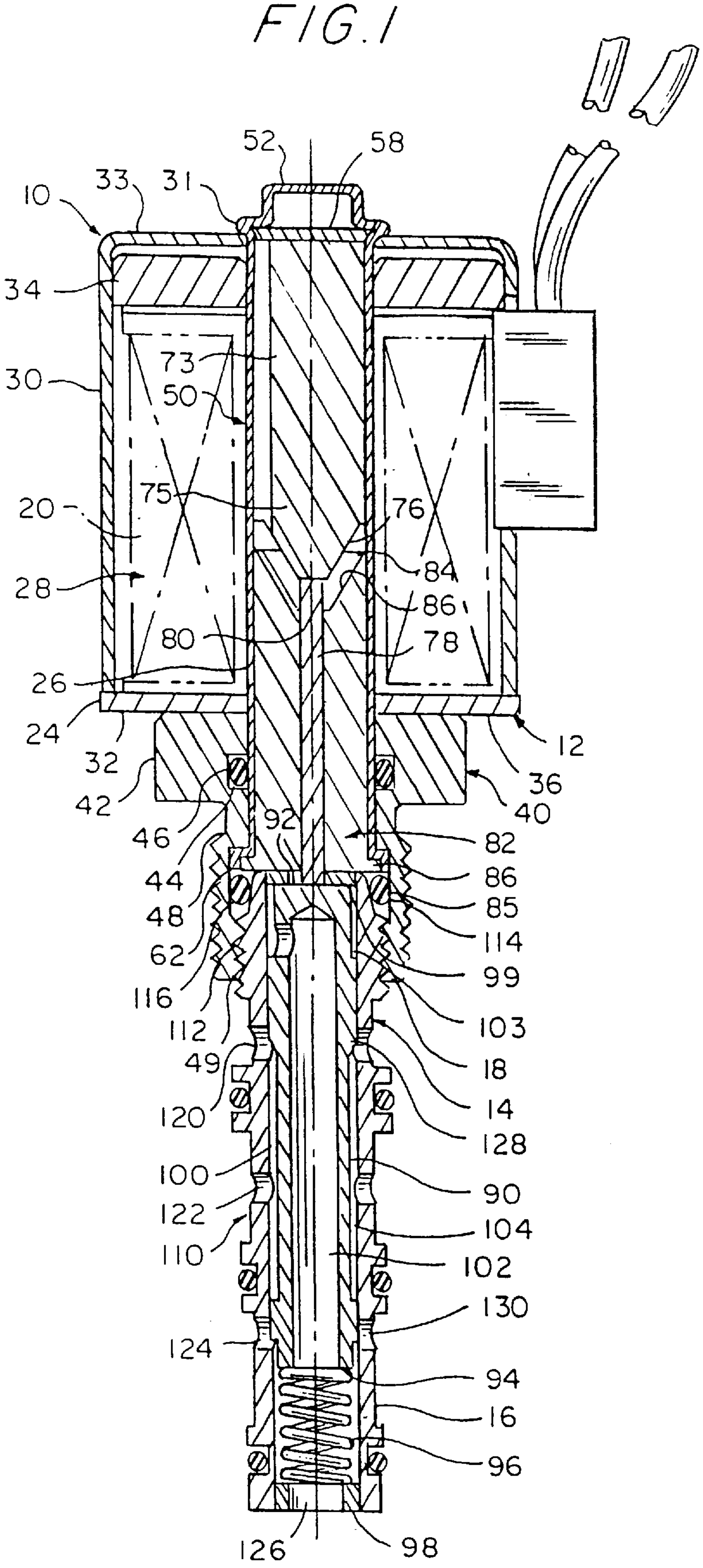
FIG. 1 is an enlarged side elevation of a miniature solenoid valve configured in accordance with the principles of the present invention showing a two position, four-way valve.
Figure 2:
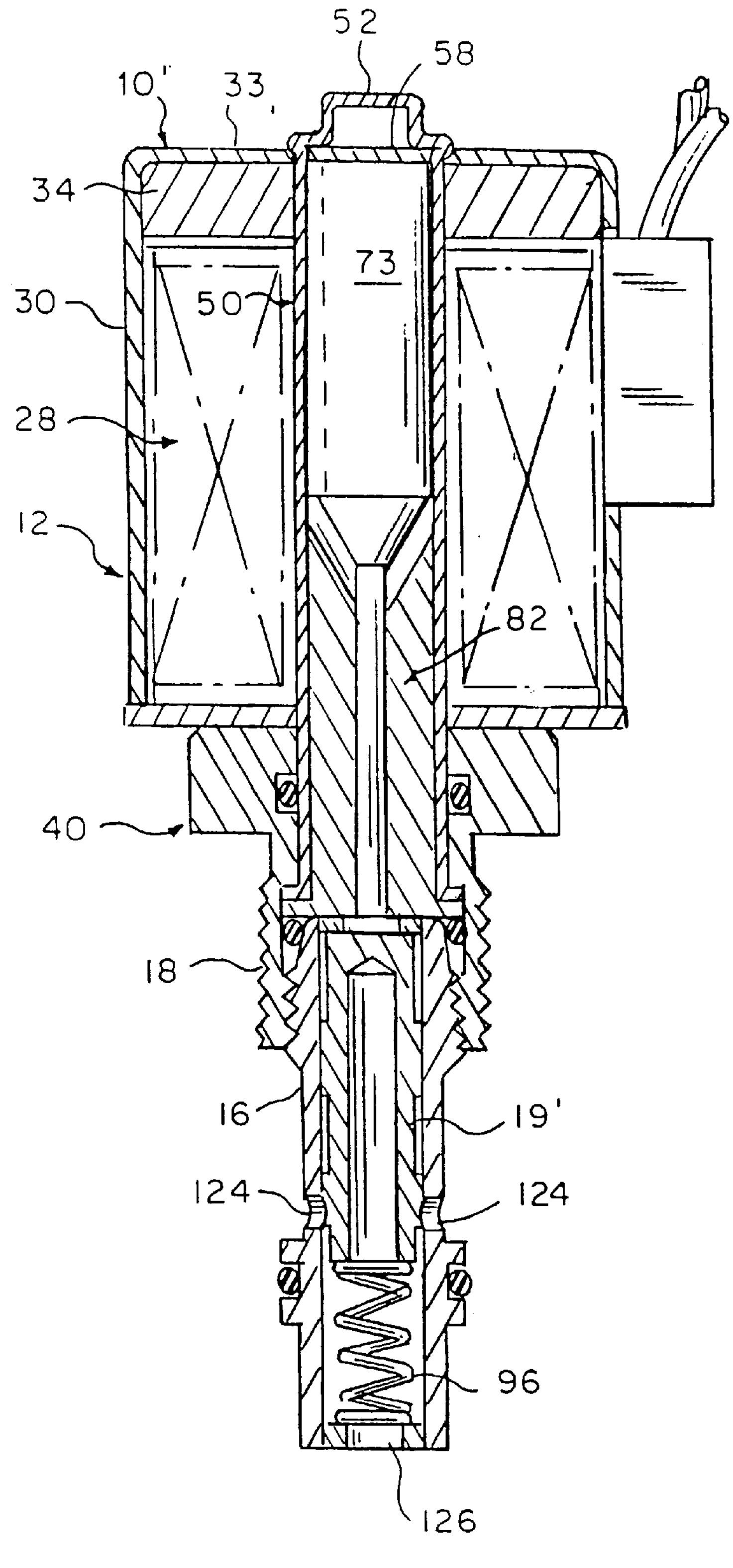
FIG. 2 is a view similar to FIG. 1 but illustrating a two position, two-way miniature solenoid valve.

Referring now to FIGS. 1 and 2, a two position four-way, normally open, miniature valve 10 and a two position two-way, normally open, miniature valve 10' are shown, wherein each valve has an identical solenoid assembly 12 but different spool assemblies 14 and 16, respectively, threaded into an internally threaded sleeve 18 on both of the solenoid assemblies 12. While four-way and two-way valve spool assemblies 14 and 16 are shown, the valve assembly may also be a three-way valve assembly or an amplified poppet two-way valve assembly. By so configuring the solenoid assemblies 12, it is possible to use the same solenoid assembly 12 for all normally open or normally closed valve logics.

Referring now mainly to FIG. 1, the FIG. 1 solenoid assembly 12 is comprised of a coil 20 wound around a plastic bobbin 24 having a hollow core 26. Coil 20 and bobbin 24 form a molded coil assembly 28 which is mounted in a non-magnetizable steel housing 30 having a round hole 31 through a closed end 33 and a base plate 32. Disposed directly above the molded coil assembly 28 is a linearizing flux washer 34.

A fitting in the form of a threaded coupling 40 abuts the outside surface 36 of the base plate 32, the coupling 40 having the internally threaded sleeve 18 unitary therewith for attaching thereto the valve spool assemblies 14 or 16 or any other valve assembly of the types previously mentioned. The coupling 40 includes a hex nut portion 42 having internally opening annular groove 44 which receives an O-ring 46. The coupling 40 also includes a radially extending, axially facing interior shoulder 48 inboard of a helical thread 49 the shoulder 48 facing away from the housing 30.

Figure 3A:
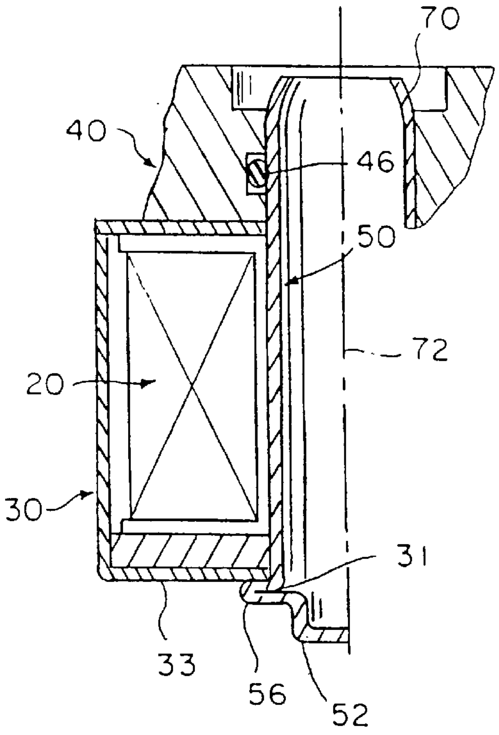
FIG. 3*a* is an enlarged side view illustrating an assembly principle of the present invention facilitating installation of an O-ring.
Figure 3B:
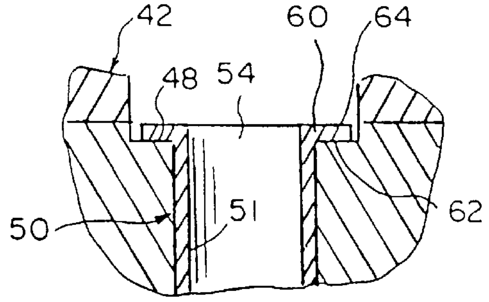
FIG. 3*b* is an enlarged side view illustrating another assembly principle of the present invention wherein components of the invention are riveted together.

Referring now to FIGS. 3A and 3B in combination with FIGS. 1 and 2, it is seen that the entire solenoid assembly 12 is retained assembled by a non-ferrous, flux tube 50 which has a tubular portion 51 with a closed end 52 and an open end 54. A preferable material for flux tube 50 is copper. Adjacent to closed end 52 is a crimp 56 which has a diameter larger than the hole 31 through closed end 33 of the housing 30. Crimp 56 serves as a stop against the closed end 33 of the housing 30 and, as is seen in FIGS. 1 and 2, provides an internal stop 58 for an armature to be discussed hereinafter. At its open end 54 the flux tube 50 has a flange 60 which extends radially outward and has a flange face 62 that is held in abutment with the axially facing, radially extending shoulder 48 of the coupling 40. The radially extending flange 60 also has an outwardly facing radial surface 64 which is abutted by a fixed core element as will be discussed hereinafter.

Referring now more specifically to FIG. 3*a,* it is seen that the flux tube 50 initially has an end portion 70 which converges toward the axis 72 of the flux tube. This provides an O-ring lead which allows the coupling member 40 with the sealing O-ring 46 therein to be slid over the open-end 54 of the flux tube 50 without cutting or damaging the O-ring 46 so as to clear the end of the flux tube. When the coupling 40 rests against the base 32, the converging end 70 of the flux tube 50 is deformed to form the flange 60 in order to hold the coupling member 40 in tight engagement with the base plate 32 of the solenoid assembly 12.

In accordance with the present invention, deformation of the converging end 70 is accomplished by a process known as "Taumel Orbital Head Forming" in which a forming tool orbits around the axis 72 of the flux tube 50 so as to deform the open end 52 thereof into the radially extending annular flange 60. While using the Taumel orbiting machine, the flange 60 is formed over many high speed revolutions (for example, over 100 revolutions) of the head the forming tool with all the pressure applied to a line on the flange so that a flowing wave of material forms ahead of the orbiting tool. This results in a flange 60 of maximum strength with no measurable change in metallurgical structure from the tubular portion 51 structure. The flange 60 holds the coupling 40 in tight engagement with the shoulder 48 which results in a tight magnetic circuit. The flux tube 50 is in effect riveted at open end 54.

By utilizing many low force, peening strikes rather than conventional riveting with a few high-force strikes, the magnetic reluctance path in the flux tube 50 is made very tight. The flux tube 50 therefore acts three capacities, i.e., an O-ring lead for O-ring 46, a flux break, and a fastener which holds the components of the solenoid assembly 12 tightly together.

Referring again mainly to FIG. 1, within the flux tube 50, there is disposed an armature 73 which abuts the internal stop 58 formed by the crimp 56 in flux tube with a free-end 74. The armature 73 has a frustoconical end 75 with a frustoconical surface 76. Projecting from the frustoconical end 75 is a rod 78 of a nonmagnetic material which pushes axially against a spool within the spool assembly 14, as will be further explained hereinafter. The rod 78 passes through a bore 80 in a fixed pole piece 82. Fixed core 82 has a first end 84 with a single frustoconical recess 86 that receives and compliments the frustoconical end 75 of the armature 73. When the coil is deenergized, there is a gap 87 between the frustoconical recess 86 and the frustoconical end 75 of the armature 73. By employing the flux tube 50 of non-magnetizable material, short circuitry of flux around the working gap 87 is prevent and the round robin effect normally associated with stacked magnetic components is avoided, resulting in substantially all of the magnetic force being applied in the working gap. A second end 85 of the fixed core 82 has a peripheral flange 86 which is in abutment with the radially extending flange 62 (see also FIG. 3*b*) of the flux tube 50.

Thus far, the solenoid assembly 12 has been described as used interchangeably with valve spools such as the valve spools 14 and 16 of FIGS. 1 and 2. The following description is of the two-position, four-way, normally open, valve spool assembly 14 of FIG. 1. As is seen in FIG. 1, the valve spool assembly 14 comprises a valve spool 90 having a first end 92 that is abutted by the rod 78 attached to the armature 70 and a second end 94 which abuts a coil spring 96 that is held in place by an annular insert 98. A bushing 99 is disposed between the first end 92 of the valve spool 90 and the valve stem 78 to prevent the valve stem from sticking to the fixed pole piece 82 of the solenoid 12. The valve spool 90 has a first relieved portion defining an axially extending annular space 100 and a second relieved portion defining an annular space 102 located proximate the second end 94 of the valve spool. Within the valve spool 90, there is a hollow core 104 which opens through the valve spool 90 via a port 106 that is in communication with the third relieved space 103, for fluid displacement behind the valve spool, as the valve spool moves away from the pole 82.

Surrounding the spool 90 to form the spool assembly 14 is a cylindrical spool housing 110. Cylindrical spool housing 110 has a threaded end 112 which is received in the internally threaded sleeve 18 of the coupling 40. O-ring seal 114 surrounds a projecting end portion 116 which surrounds the spacer 99.

The cylindrical spool housing 110 has four radial tank ports 120 (two of which are shown) which communicate with the internal annular space 100 around the spool 90 and four radial work ports 122 (two of which are shown), which also communicate with annular space 100. An axially opening work port 126 is also provided that communicates with the second annular space 102. Four radial pump ports 124 also communicate with the second annular space 102 around the end 94 of the valve spool 90. The work port 126 is in communication with the bore 104 which in turn is in communication with the third space 103 that is connected to the bore 104 by the port 106. Projecting annular lands 128 and 130 center the valve spool 90 within the valve spool housing 110 and due to their geometry provide a negative lap lag.

When the coil 20 of the solenoid assembly 12 is deenergized, the pump ports 124 connect with the work ports 126, while the work ports 122 connect to the tank ports 120. When the coil 20 of the solenoid assembly 12 is energized, the pump ports 124 disconnect from the work ports 126 and connect to work ports 122, while the tank ports 120 are blocked from all other ports.

Figure 4:
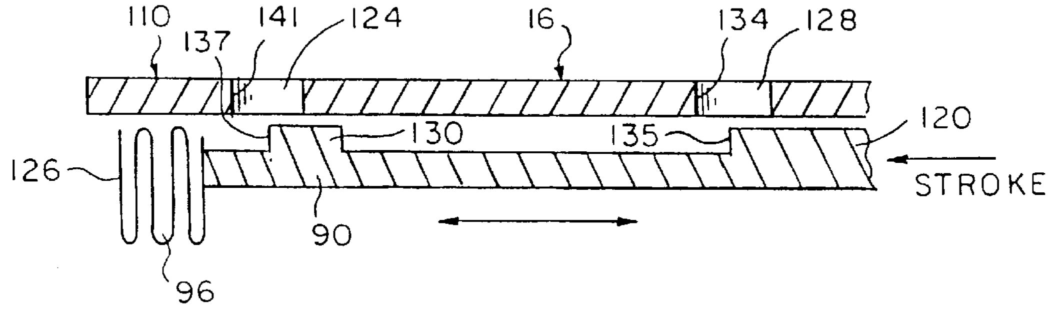
FIG. 4 is a side elevation of a proportion of a sleeve and spool assembly with the miniature solenoid valve of FIGS. 1 and 2.

Referring now to FIG. 4, it is seen that when stroking the solenoid valve 14 that the land 128 which covers the tank ports 120 closes slightly before the land 130 which closes the pump ports 124. This is because the distance between the leading edge 135 of land 128, and the leading edge 137 of the land 130 is less than the distance between the ends 139 and 141 of the tank and pump ports 120 and 124, respectively. Conversely, when the valve spool 90 is destroked, the pump port 130 opens prior to the tank port 120. This allows less shifting effort when closing tank port 120 before opening pump port 124 and is in concert with force exerted by the coil spring 96 (see FIG. 1). In SAE 6 solenoid valves, the negative lap is about 0.004" with a stroke of about 0.086".

Referring again to FIG. 2, where a two position two-way valve spool assembly 16 is shown, the valve spool assembly has essentially the same elements as the two position four-way spool with the exception that in the embodiment of FIG. 2, only the pressure ports 124' are present with the axial end port 126' being the tank port. Since there are no tank ports 120 and no radial work ports 122, there are no overlap problems.

Figure 5:
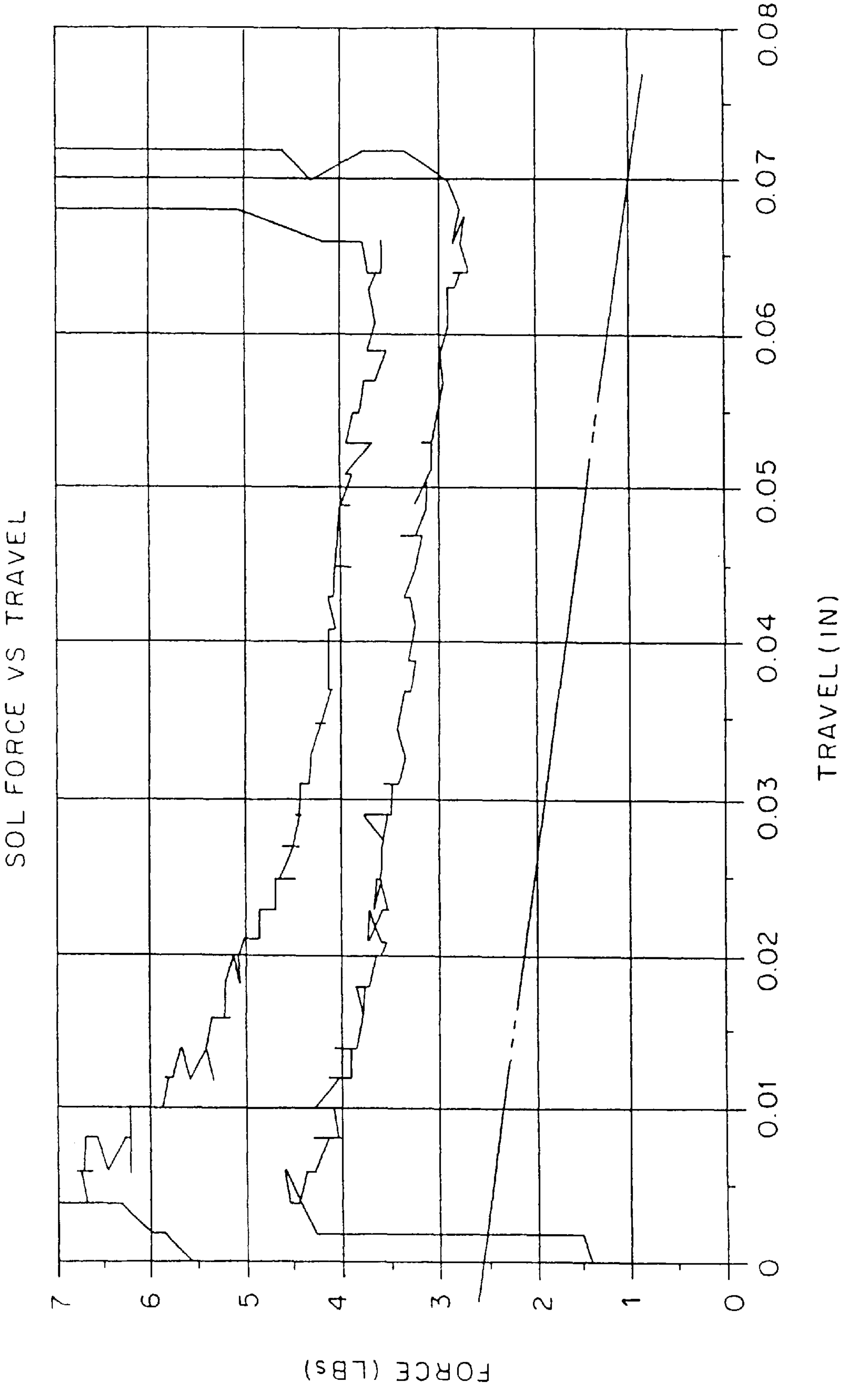
FIG. 5 is a graph illustrating solenoid force, spring force and hysterisus as a function of armature travel.

Referring now to FIG. 5 in concert with FIGS. 1 and 2, the linearizing magnetic washer 34 cooperates with the one piece, riveted flux tube 50 to create a more linear magnet force verses displacement curve which parallels the force exerted by the rate of spring 96. In FIG. 5, spring force 150, hysteresis 152 and magnetic force 154 are plotted as a function of travel for an SAE-6 valve configured in accordance with the present invention. As is readily apparent, the spring force 150, hysterisus due to friction force 152, and magnetic force 154 are substantially parallel.

Figure 6:
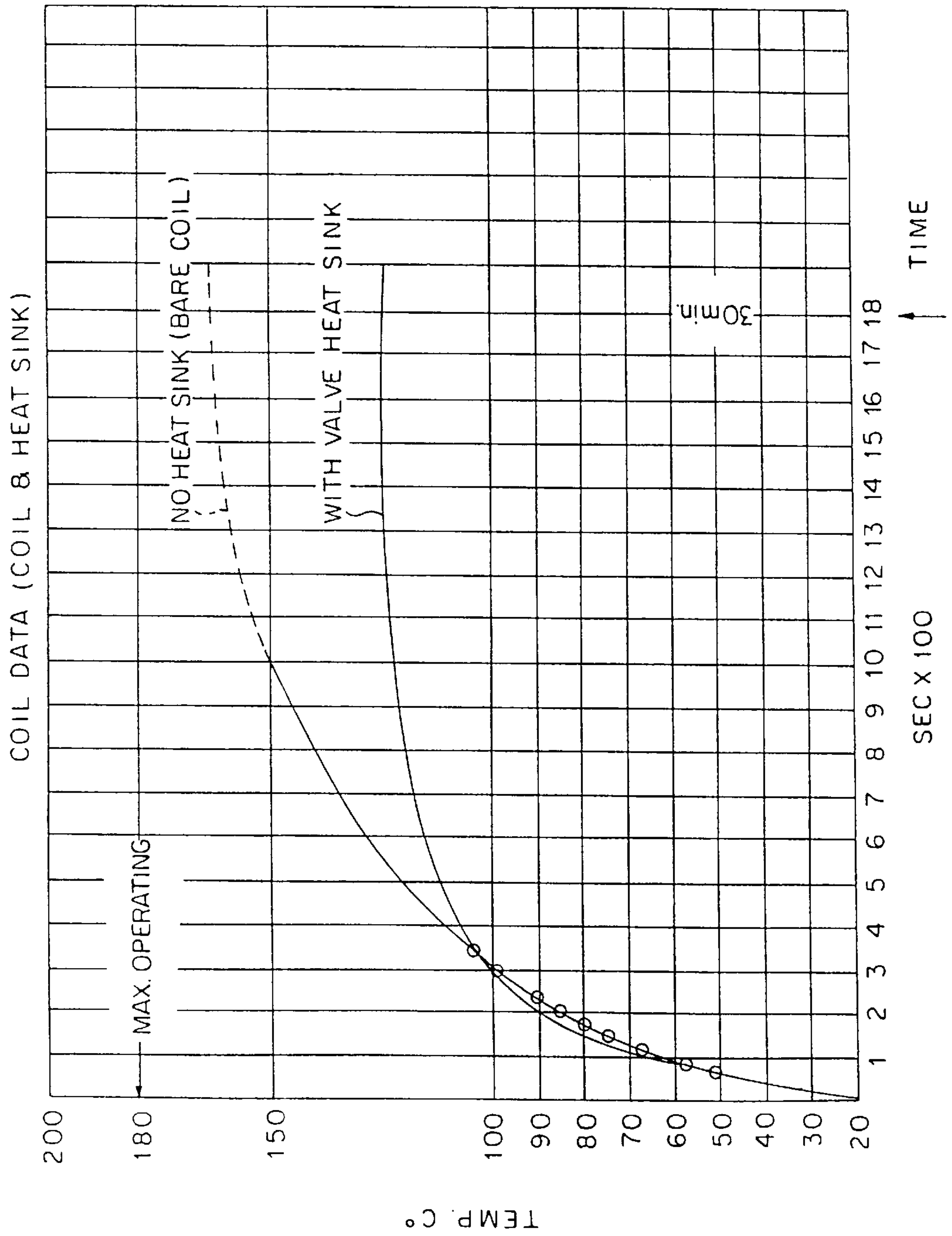
FIG. 6 is a graph illustrating heat dissipation as a function of time with a heat sink and with no heat sink.

The washer 34 basically acts as a force stroke linearizer and has a small heat sink effect which results from mounting the solenoid assembly in a mounting block or manifold. The effect of moving the armature 73 and pole 82 to magnetic saturation upon energizing is due to closing the gap between them and the coil amp-turns. The coil amp-turns are designed to cause the circuit to saturate early so that the max force is obtained and the force stroke curve is more linearized by the effect of thick washer 34. As a consequence, the coil size and current draw within the magnetic gap 87 cause the magnetic circuit to magnetically saturate early in the stroke. As seen in FIG. 6 the effect is, that as the coil 20 heats up and electrical resistance increases, the current falls off but not enough to drop out of saturation and diminish the magnetic pull force effect. With this arrangement the solenoid force output does not drop off as fast as it ordinarily would with a rise in temperature. The solenoid valve assembly 10, configured in accordance with the arrangement described herein, saturates earlier in the gap 87 and is a hedge against the temperature effect which lowers force as temperature increases.

The difficulty encountered in designing an SAE-6 solenoid valve assembly is that the armature is about –312 in diameter and thus is too small to readily accommodate the total number of magnetic flux lines Reqd. By configuring the solenoid valve as described in this specification, the force exerted by the solenoid valve shown in FIG. 5 is achievable with a coil having 1550 amp turns at 18 watts power, even with a 0.312 armature.

In summary, due to highly efficient coil and reluctance path design, a relatively high force output is obtained with a low wattage input for SAE-6 solenoid valves.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A coil assembly for a solenoid, comprising a coil having a hollow core; a metallic, non-magnetic housing surrounding the coil, the housing having end plate portions with openings therethrough aligned with the core;

a fitting disposed at one end of the housing, the fitting having a bore therethrough aligned with the hollow core and having an outwardly extending radial shoulder facing away from the housing;

a metallic non-magnetic flux tube of a selected internal diameter having a first end with a radially extending shoulder for engaging one end of one of said plate portions of the housing and a second end formed into an outwardly extending flange for engaging the outwardly extending shoulder of the fitting.

2. The coil assembly of claim 1 wherein the outwardly extending flange of the flux tube is formed by material initially coextensive therewith and formed thereafter by a series of orbital impacts.

3. The coil assembly of claim 2 further including a washer of magnetic material disposed in the housing adjacent one end of the flux tube.

4. The coil assembly of claim 3 wherein the washer is disposed adjacent the radially extending shoulder.

5. The coil assembly of claim 4 wherein the fitting has an internal groove therein in which a seal is seated and wherein the second end of the flux tube is formed from a starting diameter less than the selected internal diameter of the tube so that the seal sips readily thereover when the flux tube is slid into the fitting.

6. The coil assembly of claim 1 wherein the flux tube includes a stop therein adapted to position an armature within the flux tube and core of the coil.

7. The coil assembly of claim 1 wherein the fitting has an internally threaded end far receiving a valve spool assembly.

8. The coil assembly of claim 7 wherein the coil assembly is adapted to receive a slidable armature and a fixed pole piece within the flux tube and wherein a radially extending flange on the fixed pole piece axially positions the fixed pole piece within the flux tube.

9. The coil assembly of claim 1 wherein the flux tube is unitary and the radially extending shoulder of the flux tube is formed by a crimp in the flux tube.

10. The coil assembly of claim 9 wherein a slidable armature seats against an internal portion of the radially extending shoulder for positioning the armature within the flux tube.

11. A solenoid assembly comprising:

a coil defining a hollow core and having a first end and a second end;

a housing surrounding the coil, the housing having an axially extending wall positioned around the coil; a first end wall over the first end of the coil, the first end wall having an opening therethrough, and a second end;

a fitting disposed adjacent the second end, the fitting including a radial surface facing away from the housing;

a flux tube of non-magnetic material extending through the coil, the flux tube having a radially extending portion associated therewith at a first end thereof and a flange at a second end thereof, the radially extending portion having a diameter greater than that of the opening through the first end of the housing and the flange being riveted into engagement with the radial surface of the fitting to hold the fitting to the housing;

an armature mounted within the flux tube for axial movement therein; and a pole piece fixed within the flux tube for executing a magnetic force on the armature to move the armature in a first direction.

12. The solenoid assembly of claim 11 wherein the fixed pole piece and armature have meeting frustoconical ends.

13. The solenoid assembly of claim 12 wherein an actuator extends through the pole piece.

14. The solenoid assembly of claim 13 wherein a spring acts on the armature applying a spring force in a second direction opposite the first direction.

15. The solenoid assembly of claim 14 further including a washer of magnetic material disposed between the coil and the first end of the housing.

16. The solenoid assembly of claim 15 wherein the washer has a mass which linearizes the magnetic force so as to parallel the spring force over the stroke of the armature.

17. The solenoid assembly of claim 11 wherein a spring sets on the armature applying a spring forced in a second direction opposite the first direction.

18. The solenoid assembly of claim 17 further including a washer of magnetic material disposed between the coil and the first end of the housing.

19. The solenoid assembly of claim 18 wherein the washer has sufficient mass to linearize the magnetic force so as to parallel the spring force over the stroke of the armature.

20. The solenoid assembly of claim 11 further including a valve spool assembly the valve spool assembly having a housing coupled to the fitting and a valve spool within the housing actuated by the armature, the housing having at least one radially opening port and the valve spool having at least one portion for closing and opening the port; the solenoid assembly further including a spring biasing the spool in a direction opposite the first direction.

21. The solenoid assembly of claim 20 wherein the housing includes a plurality of radially opening ports and wherein spool end includes a plurality of portions for opening and closing the ports, the portions opening on report before opening another port.

22. The solenoid assembly of claim 21 wherein one port is a port connected to a pressure pump and the other port is an exhaust port connected to tank.

* * * * *